(12) United States Patent
Bauknecht et al.

(10) Patent No.: US 7,097,582 B2
(45) Date of Patent: Aug. 29, 2006

(54) PLANETARY GEAR

(75) Inventors: Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 175 days.

(21) Appl. No.: 10/512,919

(22) PCT Filed: May 2, 2003

(86) PCT No.: PCT/EP03/04601

§ 371 (c)(1),
(2), (4) Date: Oct. 29, 2004

(87) PCT Pub. No.: WO03/095870

PCT Pub. Date: Nov. 20, 2003

(65) Prior Publication Data

US 2005/0187060 A1    Aug. 25, 2005

(30) Foreign Application Priority Data

May 11, 2002  (DE) ............................... 102 21 097

(51) Int. Cl.
*F16H 57/04* (2006.01)
(52) U.S. Cl. .................................................. 475/159
(58) Field of Classification Search ................ 475/159, 475/331
See application file for complete search history.

(56) References Cited

U.S. PATENT DOCUMENTS

| | | |
|---|---|---|
| 4,378,711 A | 4/1983 | Daniel |
| 4,459,869 A | 7/1984 | Bucksch |
| 5,456,476 A | 10/1995 | Premiski et al. |
| 5,480,362 A | 1/1996 | Tanaka et al. |
| 5,643,126 A * | 7/1997 | Hotta et al. ............... 475/159 |
| 5,910,062 A * | 6/1999 | Mizuta ...................... 475/159 |
| 5,910,063 A | 6/1999 | Kato |
| 6,120,410 A | 9/2000 | Taniguchi et al. |
| 6,595,339 B1 | 7/2003 | Bauknecht et al. |
| 6,634,980 B1 | 10/2003 | Ziemer |

FOREIGN PATENT DOCUMENTS

| | | |
|---|---|---|
| DE | 30 12 846 A1 | 10/1981 |
| DE | 43 02 844 C1 | 7/1994 |
| DE | 197 36 686 A1 | 3/1998 |
| DE | 197 18 030 A1 | 11/1998 |
| DE | 199 32 614 A1 | 1/2001 |
| DE | 199 49 507 A1 | 4/2001 |
| EP | 0 609 659 A1 | 8/1994 |
| EP | 0 984 204 B1 | 2/2003 |

* cited by examiner

*Primary Examiner*—Dirk Wright
(74) *Attorney, Agent, or Firm*—Davis & Bujold, P.L.L.C.

(57) ABSTRACT

A planetary transmission with a planetary gearset (RS1), having a satellite carrier with planetary gearwheels (11, 14), mounted bolts (12, 15) attached to the satellite carrier. The satellite carrier comprises a web plate (17) via which lubricant is fed to the planetary gearwheels (11, 14) through lubricant bores in the bolts (12, 15) of the planetary gearwheels (11, 14). A structural element adjacent to the web plate (17) has no rotation speed relative to the web plate (17). A static-seal element (18) is arranged between the web plate (17) and the structural element adjacent to the web plate (17) above the bolts (12, 15) so that a lubricant chamber (109) is formed between the web plate (17) and the structural element adjacent to the web plate (17). Lubricant flows into this chamber (109), accumulates therein, and passes from the chamber (109) into the lubricant bores of the bolts (12, 15) of the planetary gearwheels (11, 14).

37 Claims, 5 Drawing Sheets

CLOSED SHIFT ELEMENTS

| SPEED | CLUTCH | | | BRAKE | | GEAR RATIO | STEP |
|---|---|---|---|---|---|---|---|
| | 40 | 50 | 80 | 60 | 70 | | |
| 1 | o | | | | o | 4.99 | |
| | | | | | | | 1.78 |
| 2 | o | | | o | | 2.80 | |
| | | | | | | | 1.54 |
| 3 | o | o | | | | 1.82 | |
| | | | | | | | 1.52 |
| 4 | o | | o | | | 1.20 | |
| | | | | | | | 1.44 |
| 5 | | o | o | | | 0.83 | |
| | | | | | | | 1.20 |
| 6 | | | o | o | | 0.69 | |
| R | | o | | | o | −4.07 | TOTAL 7.23 |

Static gear ratios:

$i_{ORS1} = +2.22$ $i_{ORS2} = -2.23$ $i_{ORS3} = +2.74$

PLANETARY GEAR

This application is a national stage completion of PCT/EP03/04601 filed May 2, 2003 which claims priority from German Application Serial No. 102 21 097.7 filed May 11, 2002.

FIELD OF THE INVENTION

The present invention concerns a planetary transmission.

BACKGROUND OF THE INVENTION

Many types of planetary gearsets of single-element or also multi-element planetary transmissions are known. For the lubrication and cooling of the planetary gearwheels of individual planetary gearsets it is generally provided that the bolts of the planetary gearwheels each have lubricant bores—usually a central bore and one or more radial bores—so that lubricant can be fed via these lubricant bores both to the mounting bearings and to the teeth of the planetary gearwheels concerned. For this purpose the lubricant supplied by a hydraulic system is usually fed, via a central shaft of the planetary transmission and suitably located radial holes in the said central shaft, into an area close to the individual planetary gearsets, preferably an area immediately adjacent to the planetary gearset concerned, in such manner that as a result of centrifugal force action the lubricant can flow axially past the planetary gearset in question in the radial direction. To retain this radially flowing or spraying lubricant in the area of the bolts of the respective planetary gearset, lubricant baffles are usually provided, which are usually attached to the satellite carrier of the planetary gearset concerned. The lubricant so retained then passes in a simple way into the lubricant bores of the bolts of the respective planetary gearset under centrifugal action, and is then distributed to the mounting bearings and teeth of the planetary gearwheels. An example of an arrangement for the lubrication and cooling of a planetary gearset made in such a way according to the prior art is shown in FIG. 1, in which the path of the lubricant feed is indicated as A.

However, the lubricant baffles can also be arranged on a structural element immediately adjacent to the satellite carrier, leaving only a small axial gap between the lubricant baffle and the satellite carrier.

Such arrangements for the lubrication and cooling of individual planetary gearsets are also known in combination with various gearset concepts in multi-stage planetary transmissions. For example, U.S. Pat. No. 6,120,410 discloses a sectional view of a 6-gear automatic transmission with several planetary gearsets, each having a lubricant baffle attached on its satellite carrier.

A disadvantage of these arrangements known from the prior art for lubricating and cooling the planetary gearwheels of single-element or multi-element planetary gearsets, besides having to provide the lubricant baffles as additional structural elements, is also the cost and effort of machining the respective structural elements to which the lubricant baffles have to be attached securely under rotational load, as well as the cost and effort of fitting the lubricant baffles.

The purpose of the present invention is now, starting from the aforesaid prior art, to provide a planetary transmission with at least one single-element or multi-element planetary gearset and a simple, assembly-friendly and inexpensive lubrication system for the planetary gearwheels of the planetary gearset.

SUMMARY OF THE INVENTION

The invention can be used for all the planetary gearsets of a planetary transmission in which the respective satellite carriers do not rotate relative to a nearby structural element. According to the invention it is proposed that the satellite carrier of each planetary gearset is sealed in a lubricant-tight way by means of a static-seal system against the corresponding nearby structural element, which always rotates at the same speed as the satellite carrier in question, on a diameter above the bolts of the said planetary gearset, so that a lubricant chamber is formed axially between the satellite carrier and the said nearby structural element, and the lubricant feed takes place via this lubricant chamber into lubricant bores of the bolts and from there to the mounting bearings and teeth of the planetary gearwheels of the respective gearset. In this, the structural element adjacent to the satellite carrier is a structural element of a shift element.

BRIEF DESCRIPTION OF THE DRAWINGS

The invention will now be described, by way of example, with reference to the accompanying drawings in which:

FIG. 3 is a shift scheme of the transmission of FIG. 2;

In all figures, the reference symbols of comparable elements are also homogeneously designated.

DETAILED DESCRIPTION OF THE INVENTION

Figure 1:
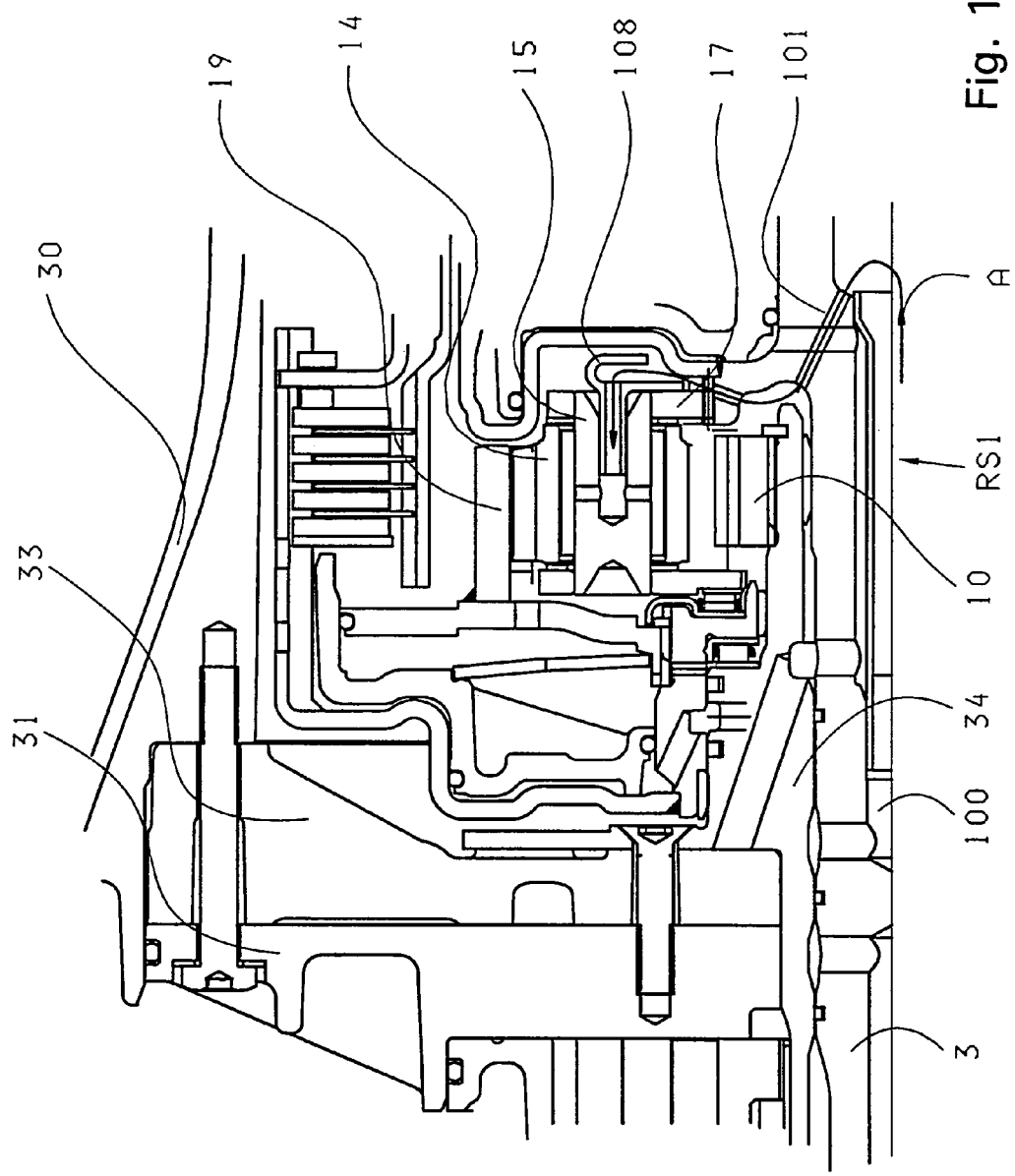
FIG. 1 is an arrangement according to the prior art for lubricating a planetary gearset.

As already mentioned, FIG. 1 shows a typical arrangement for the lubrication of an individual planetary gearset RS1 according to the prior art. The planetary gearset RS1 is positioned radially above a hub 34 which is bolted, via an intermediate plate 33 and a transmission housing wall 31 (here formed as a cover), to a transmission housing 30. A solar gearwheel 10 of the planetary gearset RS1 is positively locked onto the hub 34. The planetary gearset RS1 is driven via a web plate 17. For this, a drive input shaft 3 passes centrally through the hub 34 and planetary gearset RS1, and on the side of the planetary gearset RS1, which is turned away from the transmission housing wall 31, is connected fast to the web plate 17. A hollow gearwheel 19 forms the output element of the planetary gearset RS1. As the structural element axially adjacent to the web plate 17 there is a clutch cylinder. The path of the lubricant feed to the planetary gearwheels 14 of the planetary gearset RS1 is denoted A. Through a central lubricant feed bore 100 of the drive input shaft 3 and an oblique lubricant feed bore 101 of the drive input shaft 3, the lubricant passes into lubricant bores of the bolts 15 of the planetary gearwheels 14 and from there to the mounting bearings and teeth of the planetary gearwheels 14. To retain the lubricant, a lubricant baffle 108 of structurally elaborate design is inserted into the central lubricant bores of the bolts 15.

Figure 2:
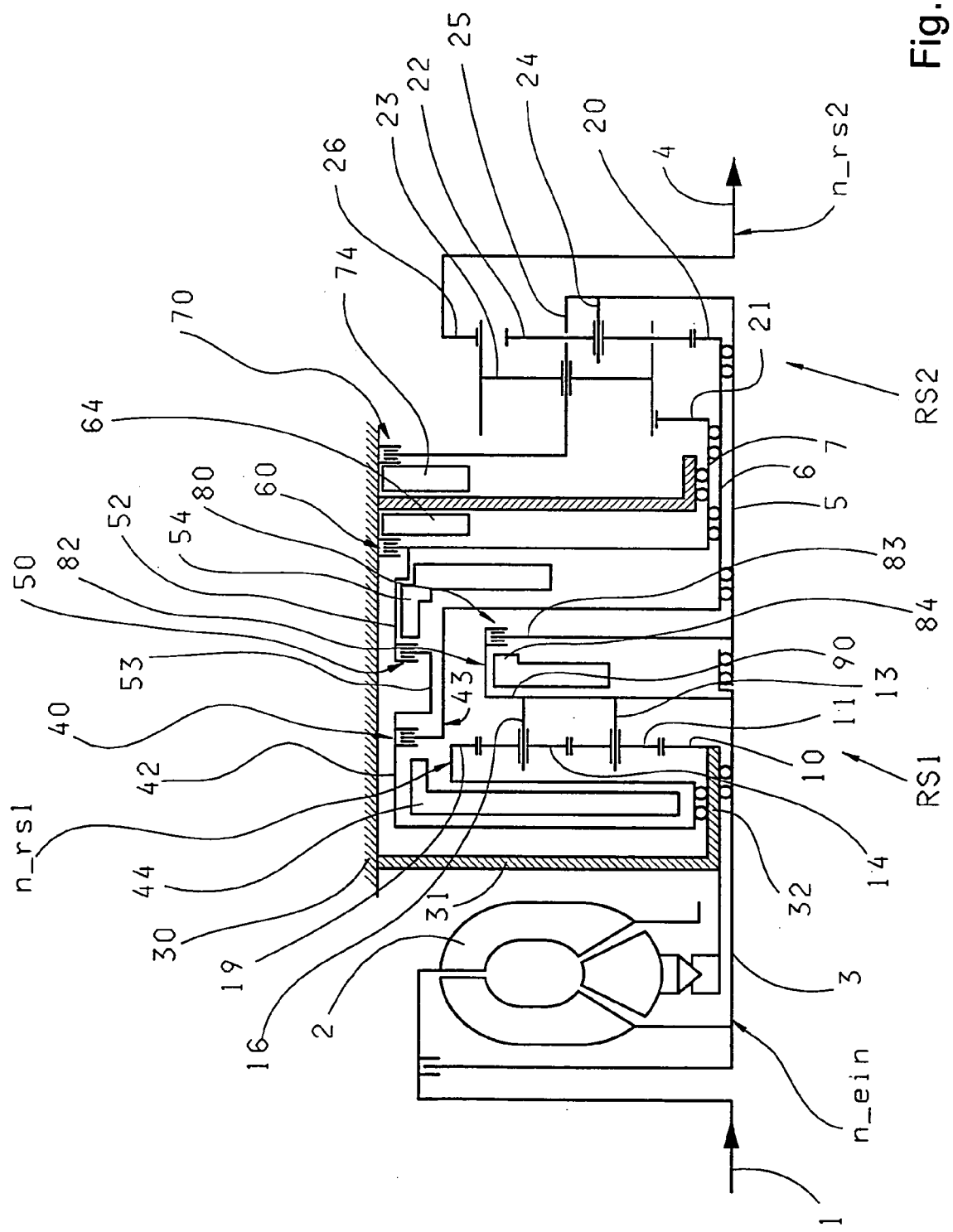
FIG. 2 is an example transmission layout of a planetary transmission having a satellite carrier with no rotation speed relative to a nearby structural element.

FIG. 2 shows an example of a transmission layout of a multi-stage automatic transmission with a single-element planetary gearset RS1 as the primary planetary gearset and a two-element, second planetary gearset RS2 as the main planetary gearset combination. In this example of a gearset design the first planetary gearset RS1 is made as a non-shiftable plus-gear with inner and outer planetary gearwheels 11, 14, a web 13 of the inner planetary gearwheels 11 being connected fast to a web 16 of the outer planetary gearwheels 14. In the above, 'plus-gear' is understood to mean a simple planetary transmission with positive static gear ratio; the ratio of the speeds of the annular gearwheel 19 and the solar gearwheel 10 of the first planetary gearset RS1 when the coupled webs 13, 16 are regarded as static, is thus positive.

In the example shown, the solar gearwheel 10 of the first planetary gearset RS1 is connected fast to a transmission housing 30 via a cylindrical projection 32 of a transmission housing wall 31. The coupled webs 13, 16 of the first planetary gearset RS1 form its input element and are connected with a drive input shaft 3 of the transmission, on the side of the first planetary gearset RS1 facing away from the transmission housing wall 31 and toward the second planetary gearset RS2. The drive input shaft 3 rotating at a transmission input speed n_in passes centrally through the cylindrical projection 32 of the transmission housing wall 31 and is in active connection with an engine shaft 1 of a drive engine (not shown), for example via a starting element in the form of a torque converter 2. The annular gearwheel 19 of the first planetary gearset RS1 forms the output element of RS1 and rotates with an output speed n_rs1.

The second planetary gearset RS2 is formed for example as a Ravigneaux gearset, a known, compact design of a two-web, four-shaft transmission unit. The said second planetary gearset RS2 comprises a small solar gearwheel 20, a large solar gearwheel 21, first and second planetary gearwheels 22 and 23, a web 24 of the first planetary gearwheels 22, a web 25 of the second planetary gearwheels 23 attached fast to the said web 24, and an annular gearwheel 26. The annular gearwheel 26 forms the output element of the second planetary gearset RS2, rotates at an output speed n_rs2 and is connected to a drive output shaft 4 of the transmission. The small solar gearwheel 21 forms a first input element of the second planetary gearset RS2. The large solar gearwheel 22 forms a second input element of the second planetary gearset RS2. Finally, the coupled webs 24, 25 form a third input element of the second planetary gearset RS2.

In combination with the five shift elements 40, 50, 60, 70 and 80 provided, a total of six forward gears can be engaged by selective pressure action upon the servomechanisms 44, 54, 64, 74, 84 associated with the shift elements 40, 50, 60, 70, 80 without range-change, as shown in the related shift scheme of FIG. 3. In this, the first input element of the second planetary gearset RS2 can be driven via the first shift element 40 made as a clutch, with the output speed n_rs1 of the first planetary gearset RS1. The second input element of the second planetary gearset RS2 can also be driven with the output speed n_rs1 of the first planetary gearset RS1 via the second shift element 50 made as a clutch, and in addition it can be fixed in relation to the transmission housing 30 by means of the third shift element 60 made as a brake. Finally, the third input element of the second planetary gearset RS2 can be driven via the fifth shift element 80 made as a clutch, with the transmission input speed n_in of the drive input shaft 3, and can be fixed in relation to the transmission housing 30 by means of the fourth shift element 70 made as a brake.

In another design of the first planetary gearset RS1 it can for example also be provided that this is made as a shiftable plus-gear, such that as before the coupled webs 13, 16 form the input element and the annular gearwheel 19 forms the output element of the said first planetary gearset RS1, but the solar gearwheel 10 can be engaged via an additional, sixth shift element made as a brake. In this way, in combination with the Ravigneaux gearset and its rotation-speed-related connection to the plus-gear and the drive input shaft 3 via the five shift elements 40, 50, 60, 70, 80, described earlier, an additional, seventh forward gear can for example be engaged, again without range change.

In the example embodiment shown in FIG. 2, an outer disk carrier 42 is the input element of the first shift element 40 and is connected to the annular gearwheel 19 of the first planetary gearset RS1. Correspondingly, an inner disk carrier 43 forms the output element of the first shift element 40 and is connected via a first solar shaft 6 to the small solar gearwheel 20 of the second planetary gearset RS2. An inner disk carrier 53 forms the input element of the second shift element 50 and is connected to the outer disk carrier 42 of the first shift element 40 and so too therefore to the annular gearwheel 19 of the first planetary gearset RS1. Correspondingly, an outer disk carrier 52 forms the output element of the second shift element 50 and is connected via a second solar shaft 7 to the large solar gearwheel 21 of the second planetary gearset RS2. An outer disk carrier 82 is the input element of the fifth shift element 80 and is connected to the drive input shaft 3 and to the coupled webs 13, 16 of the first planetary gearset RS1. Correspondingly, an inner disk carrier 83 forms the output element of the fifth shift element 80 and is connected to the coupled webs 24, 25 of the second planetary gearset RS2 via a web shaft 5.

An essential feature of the transmission layout shown in FIG. 2 is that the fifth shift element 80 is arranged directly next to the first planetary gearset RS1, on the side of the latter facing away from the transmission housing wall 31 and toward the second planetary gearset RS2. In this configuration a disk-shaped section 90 of the cylindrically shaped outer disk carrier 82 of the fifth shift element 80 is axially directly adjacent to the coupled webs 13, 16 of the inner and outer planetary gearwheels 11, 14 of the first planetary gearset RS1. Owing to the force-flow connection of the coupled webs 13, 16 of the first planetary gearset RS1 and the outer disk carrier 82 of the fifth shift element 80 to the drive input shaft 3, it can be seen that there is no relative rotation between the coupled webs 13, 16 and the outer disk carrier 82.

Accordingly, such a gearset configuration of a multi-stage automatic transmission is particularly well suited for the incorporation of a planetary gearset according to the invention, as will be explained in detail below with reference to two example variants illustrated in FIGS. 4 and 5.

Figure 4:
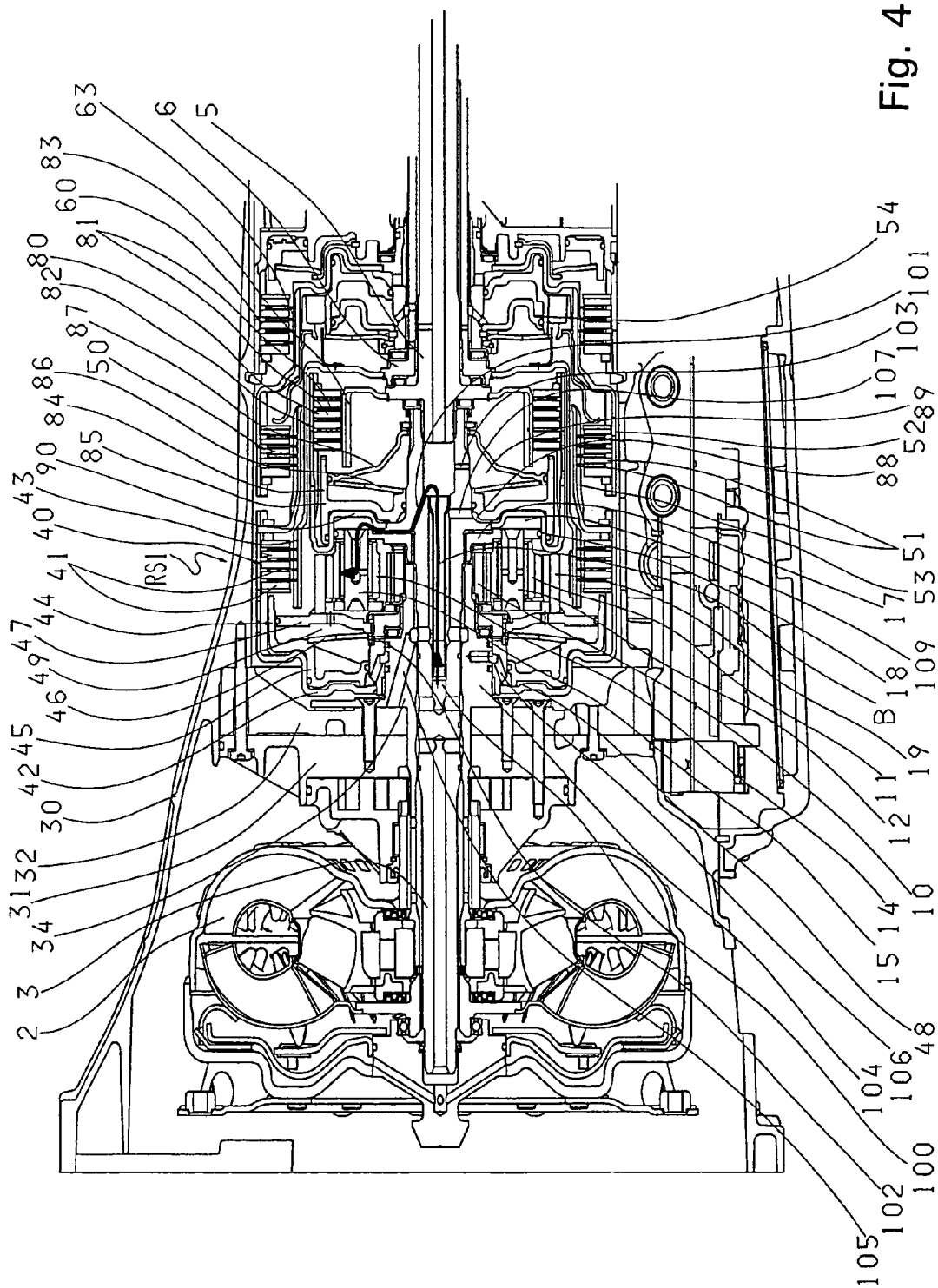
FIG. 4 is an example first variant of a planetary transmission according to the invention.

FIG. 4 shows a section of part of a transmission in an example layout of the automatic transmission according to FIG. 2. A structural group around the first planetary gearset RS1 is shown. With reference to this example design detail a first example variant of a planetary gearset with optimized lubricant feed will now be explained.

As can be seen in FIG. 4, the spatial arrangement of the first planetary gearset RS1, the first, second and fifth shift elements 40, 50, 80 each made as a clutch, and the third shift element 60 made as a brake, corresponds within the transmission housing 30 and relative to one another to the arrangement represented schematically in FIG. 2.

The transmission housing 30 comprises a transmission housing wall 31 which forms an outer wall (for example made as a cover) in the direction of a starting element of the transmission made for example as a torque converter 2.

Inside the transmission housing 30 an intermediate plate 33 is provided, which is bolted to the transmission housing wall 31 and the transmission housing 30 and which, in particular, has various pressure medium ducts (not shown in detail). In turn, a hub 34 is bolted to this intermediate plate 33. The hub 34 has, in particular a pressure-feed duct 104 leading to a piston space 48 of the first shift element 40, and a pressure-feed duct 105 leading to a piston space 88 of the fifth shift element 80. At least mainly in the radial direction above the hub 34 is arranged the (first) planetary gearset RS1, whose solar gearwheel 10 is fixed on the hub 34, preferably with positive locking by virtue of an appropriately formed carrier profile.

Next to the solar gearwheel 10, the (first) planetary gearset RS1 formed as a plus-gear has at least one inner planetary gearwheel 11 mounted by means of a bolt 12 to rotate on a web plate 17, at least one outer planetary gearwheel 14 also mounted by means of a bolt 15 to rotate on the web plate 17, and an annular gearwheel 19. Thus, the web plate 17 fulfils the function of coupling the two respective webs of the inner and outer planetary gearwheels 11, 14 and as the input element of the planetary gearset RS1, is connected on the side of the planetary gearset RS1 opposite to the intermediate plate 33 to a drive input shaft 3 which passes centrally through the hub 34 and the planetary gearset RS1, preferably with positive locking by means of an appropriately formed carrier profile. The annular gearwheel 19 forms the output element of the planetary gearset RS1.

In accordance with the force-flow scheme of FIG. 2, the annular gearwheel 19 of the planetary gearset RS1 is connected to an outer disk carrier 42 of the first shift element 40. In this case, the said outer disk carrier 42 of the first shift element 40 is formed as a cylinder, which is open in the direction opposite to the intermediate plate 33 or to the torque converter 2 and is directly adjacent to the intermediate plate 33. Analogously to FIG. 2, the outer disk carrier 42 of the first shift element 40 is mounted by means of a hub-shaped section, which extends axially between the intermediate plate 33 and the planetary gearset RS1 directly above the hub 34, radially over the hub 34 bolted to the intermediate plate 33. An at least largely disk-shaped section of the outer disk carrier 42 of the first shift element 40 extends radially along the intermediate plate 33. On a larger diameter, a cylindrical section of the outer disk carrier 42 is attached to the said disk-shaped section and extends axially in the direction opposite to the intermediate plate 33 as far as over the disks 41 of the first shift element 40, which are arranged in the radial direction over the annular gearwheel 19 of the planetary gearset RS1.

A servomechanism 44 of the first shift element 40 is arranged within the outer disk carrier 42, axially adjacent to the planetary gearset RS1, and this actuates the disks 41 of the first shift element 40 in the direction opposite to the intermediate plate 33. Here, the servomechanism 44 of the first shift element 40 comprises a piston 45, a piston restoring spring 46 for example made as a cup spring, and a baffle plate 47. The piston 45 and the outer disk carrier 42 form the piston space 48 of the first shift element 40, which can be acted on by pressure via a pressure-feed bore 106 of the (rotating) outer disk carrier 42 of the first shift element 40 and the pressure-feed duct 104 of the hub 34 (fixed on the housing). On the side of the piston 45 opposite the piston space 48 are arranged the piston restoring spring 46 and the baffle plate 47, so that a pressure equalization space 49 sealed with respect to the piston 45 is formed between the piston 45 and the baffle plate 47. Thereby, the hydrodynamic pressure of the rotating piston space 48 of the first shift element 40 is equalized preferably completely, but at least partially. In the example shown, lubricant is fed into the pressure equalization space 49 via a central lubricant bore 100 of the drive input shaft 3, via a lubricant feed bore 101 of the drive input shaft 3 (oblique in this example), via gaps of the drive teeth between the drive input shaft 3 and the web plate 17, via gaps in the drive teeth between the hub 34 and the solar gearwheel 10, via gaps in the mounting of the outer disk carrier 42 on the hub 34, and via a lubricant feed bore 102 of the outer disk carrier 42. In the example embodiment shown, the baffle plate 47 is welded to the annular gearwheel 19 of the planetary gearset RS1 and additionally serves to transfer torque between the annular gearwheel 19 and the hub-shaped section of the outer disk carrier 42 of the first shift element 40.

In the context of explaining FIG. 5, another possible design of the lubricant feed to the pressure equalization space 49 of the first shift element 40, which does not take place via correspondingly formed lubricant bores in the drive input shaft 3, will be described later.

As shown in FIG. 4, the fifth shift element 80 is arranged on the side of the planetary gearset RS1 opposite the servomechanism 44 of the first shift element 40 and the intermediate plate 33. An outer disk carrier 82 of the fifth shift element 80 forms its input element and is connected to the drive input shaft 3. Here, the outer disk carrier 82 is made as a cylinder open in the direction opposite to the planetary gearset RS1 and directly adjacent to the latter. Analogously to FIG. 2, an at least largely disk-shaped section 90 of the outer disk carrier 82 is connected fast to the drive input shaft 3 and extends radially, directly next to the web plate 17, approximately as far as the outer diameter of the annular gearwheel 19 of the planetary gearset RS1. Here, a cylindrical section of the outer disk carrier 82 is connected to the disk-shaped section 90, extends first axially toward the planetary gearset RS1 and radially beyond the web plate 17 and directly to the annular gearwheel 19, and then extends in the direction opposite to the planetary gearset RS1 as far as the disks 81 of the fifth shift element 80.

Since in accordance with the concept there is no relative rotation speed between the web plate 17 of the planetary gearset RS1 and the input element of the fifth shift element 80 formed in this example by the outer disk carrier 82 thereof, according to the invention a sealing element 18 is provided between the web plate 17 driven with the transmission input speed n_in and the outer disk carrier 82, on a diameter outside the respective bolts 12, 15 of the inner and outer planetary gearwheels 11, 14 of the planetary gearset RS1. This sealing element 18 can particularly advantageously be made as a simple O-ring. In the example shown, the sealing element 18 is set into a radial groove of the web plate 17. In other designs, an axial groove can for example be provided in the web plate 17 or in the disk carrier 82 to hold the sealing element 18. However, any other known element 18, for example lip sealing rings, rectangular rings, gasket seals or lubricant-resistant bonding, could be used.

Thus, according to the invention a lubricant chamber 109 is formed axially between the driven web plate 17 of the planetary gearset RS1 and the structural element axially adjacent thereto—in this example embodiment the outer disk carrier 82 of the fifth shift element 80. In FIG. 4 the lubricant feed to the mountings of the planetary gearwheels 11, 14 of the planetary gearset RS1 is denoted B and takes place via the central lubricant-feed bore 100 of the drive input shaft 3, via the lubricant-feed bore 101 of the drive input shaft 3 made in this example as an oblique bore, through which the pressure equalization space 49 of the first shift element 40 is also supplied with lubricant, via a radial gap extending between the web plate 17 and the disk-shaped section 90 of the outer disk carrier 82 of the fifth shift element, and into the said lubricant chamber 109. From the lubricant chamber 109 the lubricant passes via central and radial lubricant bores of the bolts 12, 15 to the mountings and teeth of the planetary gearwheels 11, 14 of the planetary gearset RS1. This achieves optimum lubricant supply to the rotating planetary gearwheels 11 and 14 without the need for a costly and elaborate additional component such as a lubricant baffle fixed to the web plate 17.

A servomechanism 84 of the fifth shift element 80 is arranged inside the outer disk carrier 82 of the fifth shift element 80, close to the planetary gearset RS1, and this actuates the disks 81 of the fifth shift element 80 in the direction opposite to the planetary gearset RS1. Like the servomechanism 44 of the first shift element 40, the servomechanism 84 of the fifth shift element 80 also has dynamic pressure equalization in addition to an actuation device for the disks 81. Here, the servomechanism 84 comprises a piston 85, a piston restoring spring 86 for example made as a cup spring, and a baffle plate 87. The piston 85 and the outer disk carrier 82 form the piston space 88 of the fifth shift element 80, which can be acted on by pressure via a pressure-feed bore 107 of the drive input shaft 3. On the side of the piston 85 opposite the piston space 88, the piston restoring spring 86 and the baffle plate 87 are arranged such that between the piston 85 and the baffle plate 87 a pressure equalization space 89 pressure-sealed with respect to the piston 85 is formed. Thereby, the hydrodynamic pressure of the rotating pressure space 88 of the fifth shift element 80 is equalized, preferably completely but at least partially. In the example shown, the lubricant is fed to the pressure equalization space 89 via the central lubricant bore 100 of the drive input shaft 3 and via a radial lubricant-feed bore 103 of the drive input shaft 3.

An inner disk carrier 83 forms the output element of the fifth shift element 80 and extends in the axial direction radially under the disks 81 of the fifth shift element 80, centrally to a centrally arranged web shaft 5, to which it is solidly connected. The connection of the web shaft 5 to the second planetary gearset RS2 is not shown in more detail.

An inner disk carrier 43 forms the output element of the first shift element 40 and spans completely across the fifth shift element 80. Here, the inner disk carrier 43 extends in the axial direction from the disks 41 of the first shift element 40 as far as the disks 81 of the fifth shift element 80 and runs on the side of the disks 81 facing away from the planetary gearset RS1 centrally in the direction of the web shaft 5, as far as a first solar shaft 6 extending axially above the web shaft 5, to which it is solidly connected. The connection of the first solar shaft 6 to the second planetary gearset RS2 is again not shown.

Corresponding to the force-flow scheme according to FIG. 2, an inner disk carrier 53 is connected as the input element of the second shift element 50 to the outer disk carrier 42 of the first shift element 40. The disks 51 of the second shift element 50 are arranged above the disks 81 of the fifth shift element 80. An outer disk carrier 52 forms the output element of the second shift element and is formed as a cylinder open toward the planetary gearset RS1. Here, an inner disk carrier 63 of the third shift element 60 is integrated in the outer disk carrier 52. A servomechanism 54 of the second shift element 50 is arranged inside the cylindrical outer disk carrier 52, axially adjacent to the disks 81 of the fifth shift element 80, such that only a disk-shaped section of the inner disk carrier 43 of the first shift element 40, which surrounds the fifth shift element 80, extends in the radial direction between the said disks 81 and the servomechanism 54.

As can be seen in FIG. 4, this is an exceptionally compact and space-saving arrangement of a structural group of the gearset concept according to FIG. 2, which consists of the first planetary gearset RS1 and the first, second and fifth shift elements 40, 50 and 80, with optimum lubricant supply to the rotationally highly loaded planetary gearwheels 11, 14 of the first planetary gearset RS1.

Figure 5:
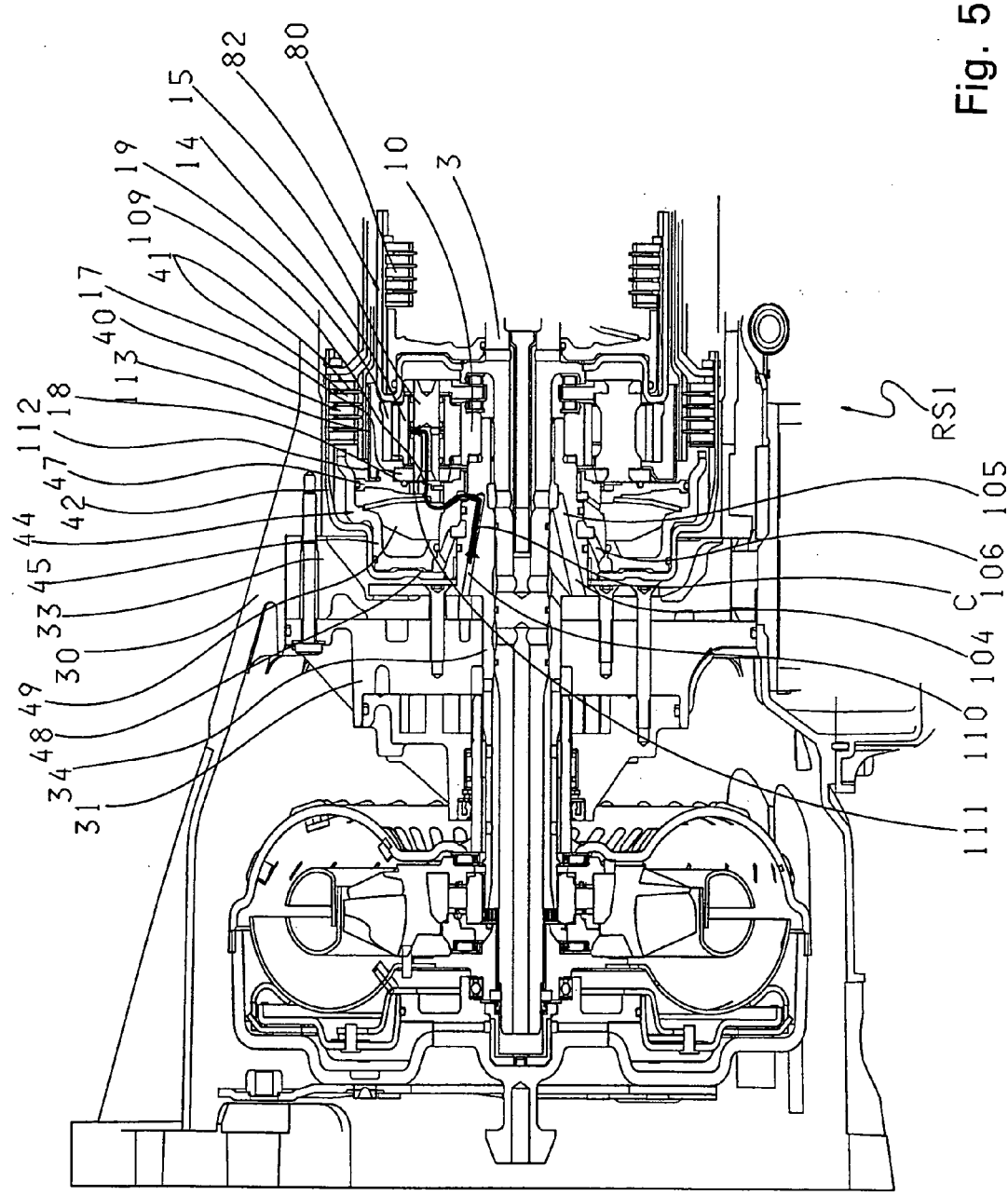
FIG. 5 is an example second variant of a planetary transmission according to the invention.

FIG. 5 shows a section of a gear aggregate of another example layout of a planetary transmission according to the invention. In this, the spatial arrangement of the individual structural elements and the rotational connection of the input and output elements of the planetary gearset itself RS1 to other transmission components are based on the gearset concept of the prior art of U.S. Pat. No. 6,120,410. Thus, the (first) planetary gearset RS1 corresponds in its function and rotational connections, to a primary planetary gearset, which is driven with a transmission input speed n_in and whose output speed n_rs1, which is always lower than the transmission input speed n_in, can be transmitted via two shift elements to two input elements of a main planetary gearset not connected to one another, and a third input element of the main planetary gearset can additionally be driven at the transmission input speed n_in by a further shift element. Similarly to FIG. 4, in FIG. 5 a structural group all around the first planetary gearset RS1 is shown. With reference to this example detail design, a second example variant of a planetary gearset according to the invention with optimised lubricant feed will now be explained.

The essential differences from the example layout of the structural group around the first planetary gearset described in detail earlier with reference to FIG. 4 are, on the one hand, that the planetary gearset is made as a minus-gear, i.e., with a single planetary gearwheel instead of double planetary gearwheels. In this, 'minus-gear' is understood to mean a simple planetary transmission with a negative static gear transmission ratio; thus, if the web is thought of as static, the ratio of the speeds of the annular gearwheel 19 and the solar gearwheel 10 of the planetary gearset RS1 is negative. On the other hand, the annular gearwheel 19 is now the input element of the planetary gearset RS1 connected fast to the drive input shaft 3, and the web plate 17 is now the output element of the planetary gearset RS1. The solar gearwheel 10 is, as before, fixed on the transmission housing 30 by means of the hub 34, the intermediate plate 33 and the transmission housing wall 31.

The fifth shift element 80, in particular its outer disk carrier 82, is adjacent to the planetary gearset RS1 on the side of the latter opposite to the housing wall 31 (in contrast to U.S. Pat. No. 6,120,410 but as in the arrangement of FIG. 4). The spatial arrangement of the first shift element 40—in particular the spatial arrangement of its outer disk carrier 42 and servomechanism 44—inside the transmission housing and relative to the planetary gearset RS1 also corresponds to the arrangement shown in FIG. 4. The outer disk carrier 42, being the input element of the first shift element 40, is connected on the side of the planetary gearset RS1 facing toward the transmission housing wall 31 or the servomechanism 44 of the first shift element 40, to the output element of the planetary gearset RS1, now formed as a web plate 17. As in FIG. 4, the baffle plate 47 of the servomechanism 44 of the first shift element 40 is axially directly adjacent to the planetary gearset RS1 on its side facing toward the transmission housing wall 31 and the piston 45. Analogously to FIG. 4, the baffle plate 47 together with the piston 45 of the first shift element 40 form the pressure equalization space 49 for equalizing the hydrodynamic pressure of the rotating piston space 48 of the first shift element 40, and transfer the torque from the output element of the planetary gearset RS1, here formed by the annular gearwheel 19, to the input element of the first shift element 40, here formed by its outer disk carrier 42.

An essential feature is that—in contrast to the first example variant of a planetary gearset according to the invention shown in FIG. 4—there is in this case no relative rotation speed between the web plate 17 and the baffle plate 47.

According to the invention, a sealing element 18 is provided between the web plate 17 and the output element of the planetary gearset RS1—in this example the baffle plate 47 of the servomechanism 44 of the first shift element 40—that is axially adjacent to the said web plate 17 (in the direction of the transmission housing wall 31 and the servomechanism 44 of the first shift element 40), on a diameter larger than the bolts 15 of the planetary gearwheels 14 of the planetary gearset RS1. In a particularly advantageous manner, this sealing element 18 can be in the form of a simple O-ring. In the example shown, the sealing element 18 is set into an axial groove of the baffle plate 47. In a different design the sealing element 18 can also be arranged in an axial groove of the web plate 17. Instead of an axial groove to hold the sealing element 18, the baffle plate 47 or web plate 17 could for example also have a radial groove. For the sealing element 18 any other known static-seal system could also be used, for example lip sealing rings, rectangular rings, gasket seals or lubricant-proof bonding.

Thus, according to the invention, a lubricant chamber 109 is formed between the web plate 17 of the planetary gearset RS1 and the structural element axially adjacent to it—in the example embodiment according to FIG. 5 the baffle plate 47 of the servomechanism 44 of the first shift element 40. The lubricant chamber 109 so formed in this second variant of a planetary gearset according to the invention is thus arranged on the side of the planetary gearset RS1 facing toward the transmission housing wall 31 and the intermediate plate 33.

As shown in FIG. 5, the hub 34, which is as before bolted to the transmission housing 30 via the intermediate plate 33 and the transmission housing wall 31, now has a lubricant-feed duct 110 in addition to the pressure-feed ducts 104, 105 for the supply of pressure to the piston spaces 48, 88 of the first and fifth shift elements 40 and 80. Through this lubricant-feed duct 110, lubricant provided by a hydraulic control unit (not shown) is first conveyed to the pressure equalization space 49 of the first shift element 40. From the pressure equalization space 49 the lubricant passes via a lubricant bore 111 of the baffle plate 47 into the lubricant chamber 109 and from there, via central and radial lubricant bores of the bolts 15, to the mountings and teeth of the planetary gearwheels 14 of the planetary gearset RS1. The path of this lubricant feed is denoted C in FIG. 5.

In another design, the hub 34 and the intermediate plate 33 can also be integrated as one piece. In a further design it can also be provided that the hub 34 is integrated in the transmission housing wall 31, as a cylindrical projection extending in the direction of the first planetary gearset RS1. Obviously, the transmission housing wall 31 and the transmission housing 30 could also be made integrally.

The efficacy of the pressure equalization space 49 of the first shift element 40 is determined by the outer diameter of the baffle plate 47 and the pitch circle diameter of the outlet edge of the lubricant bores of the bolts 15 of the planetary gearset RS1. To ensure that this entire pressure equalization space 49 is always filled with lubricant, the lubricant bore 111 of the baffle plate 47 has a larger pitch circle diameter than the pitch circle diameter of the lubricant bores of the bolts 15 that are effective for the lubricant inflow. By virtue of an appropriate design of the outlet cross-sections of the lubricant supply to the planetary gearwheels 14 of the planetary gearset RS1, it can be ensured that the effective dynamic pressure of the pressure equalization space 49 is not influenced negatively by accumulation effects.

If it is provided, for example in a different design, that the pitch circle diameter of the lubricant bore 111 of the baffle plate 47 is smaller than the pitch circle diameter of the lubricant bores of the bolts 15 that is effective for the lubricant inflow, then it is the pitch circle diameter of the lubricant bore 111 of the baffle plate 47 which determines the effective area of the pressure equalization space 49.

If, in combination with the second lubricant supply system for the planetary gearwheels of the planetary gearset explained with reference to FIG. 5, a different structure of the planetary gearset for example with double planetary gearwheels is provided—such as that in FIG. 4—it is appropriate to match the diameters of the lubricant bores of the respective bolts of the inner and outer planetary gearwheels to one another, in such manner that the lubricant outlet of the bolts with smaller pitch circle diameter corresponds at least approximately to the lubricant outlet of the bolts with larger pitch circle diameter. For example, for this purpose the central lubricant bore of the outer bolts can have a slightly smaller diameter than the central lubricant bore of the inner bolts. This achieves uniform lubricant supply to all the planetary gearwheels of the planetary gearset from the pressure equalization space of the shift element, which is directly adjacent to the satellite carrier.

According to FIG. 5 a suitable lubricant feed to the disks 41 of the first shift element 40 is provided in the form of a cylindrical lubricant pot 112, which is connected to the web plate 17 for example by a bayonet connection and which admits the lubricant sprayed off the planetary gearset RS1 to the disks 41 of the first shift element 40 through appropriately formed apertures 113 in the said lubricant pot 112.

Those with knowledge in the field will perceive clearly that the arrangement of the first planetary gearset RS1 and the first 40 and fifth 80 shift elements shown in FIG. 5, can be combined in a simple way with the arrangement of the second planetary gearset RS2 and the other shift elements 50, 60, 70 shown in FIG. 2.

REFERENCE NUMERALS

A Path of the lubricant feed according to the prior art
B Path of the lubricant feed according to a first example embodiment of the invention
C Path of the lubricant feed according to a second example embodiment of the invention
RS1 First planetary gearset
RS2 Second planetary gearset
n_in Transmission input speed
n_rs1 Output speed of the first planetary gearset
n_rs2 Output speed of the second planetary gearset, transmission output speed
1 Engine shaft
2 Toque converter
3 Drive input shaft
4 Drive output shaft
5 Web shaft of the second planetary gearset
6 First solar shaft of the second planetary gearset
7 Second solar shaft of the second planetary gearset 10 Solar gearwheel of the first planetary gearset
11 Inner planetary gearwheel of the first planetary gearset
12 Bolts of the inner planetary gearwheel of the first planetary gearset
13 Web of the inner planetary gearwheel of the first planetary gearset
14 Outer planetary gearwheel of the first planetary gearset
15 Bolts of the outer planetary gearwheel of the first planetary gearset
16 Web of the outer planetary gearwheel of the first planetary gearset
17 Web plate of the first planetary gearset
18 Sealing element of the web plate
19 Annular gearwheel of the first planetary gearset
20 Small solar gearwheel of the second planetary gearset
21 Large solar gearwheel of the second planetary gearset
22 First planetary gearwheel of the second planetary gearset
23 Second planetary gearwheel of the second planetary gearset
24 Web of the first planetary gearwheel of the second planetary gearset
25 Web of the second planetary gearwheel of the second planetary gearset
26 Annular gearwheel of the second planetary gearset
30 Transmission housing
31 Transmission housing wall
32 Cylindrical projection of the transmission housing wall
33 Intermediate plate
34 Hub
40 First shift element
41 Disks of the first shift element
42 Outer disk carrier of the first shift element
43 Inner disk carrier of the first shift element
44 Servomechanism of the first shift element
45 Piston of the first shift element
46 Piston restoring spring of the first shift element
47 Baffle plate of the first shift element
48 Piston space of the first shift element
49 Pressure equalization space of the first shift element
50 Second shift element
51 Disks of the second shift element
52 Outer disk carrier of the second shift element
53 Inner disk carrier of the second shift element
54 Servomechanism of the second shift element
55 Piston of the second shift element
56 Piston restoring spring of the second shift element
57 Baffle plate of the second shift element
58 Piston space of the second shift element
59 Pressure equalization space of the second shift element
60 Third shift element
63 Inner disk carrier of the third shift element
64 Servomechanism of the third shift element
70 Fourth shift element
74 Servomechanism of the fourth shift element
80 Fifth shift element
81 Disks of the fifth shift element
82 Outer disk carrier of the fifth shift element
83 Inner disk carrier of the fifth shift element
84 Servomechanism of the fifth shift element
85 Piston of the fifth shift element
86 Piston restoring spring of the fifth shift element
87 Baffle plate of the fifth shift element
88 Piston space of the fifth shift element
89 Pressure equalization space of the fifth shift element
90 Disk-shaped section of the outer disk carrier of the fifth shift element
100 Central lubricant feed bore of the drive input shaft
101 Lubricant feed bore of the drive input shaft to the planetary gearwheels of the first planetary gearset and to the pressure equalization space of the first shift element
102 Lubricant feed bore of the outer disk carrier of the first shift element to the pressure equalization space of the first shift element
103 Lubricant feed bore of the drive input shaft to the pressure equalization space of the fifth shift element
104 Pressure-feed duct of the hub to the piston space of the first shift element
105 Pressure-feed duct of the hub to the piston space of the fifth shift element
106 Pressure-feed duct of the outer disk carrier of the first shift element to the piston space of the first shift element
107 Pressure-feed duct of the drive input shaft to the piston space of the fifth shift element
108 Lubricant retention baffle
109 Lubricant chamber
110 Lubricant feed duct of the hub to the planetary gearwheels of the first planetary gearset
111 Lubricant bore of the baffle plate of the first shift element
112 Lubricant pot of the first shift element
113 Aperture in the lubricant pot of the first shift element

The invention claimed is:

1. A planetary transmission with at least one first planetary gearset (RS1), which comprises a satellite carrier with planetary gearwheels (11, 14) mounted by means of bolts (12, 15) solidly fixed to the satellite carrier so as to rotate thereon, such that a face of the satellite carrier is made as a web plate (17) from an outside of which lubricant is fed to the planetary gearwheels (11, 14) via lubricant bores of the bolts (12, 15), and with a structural element axially directly adjacent to the web plate (17), which has no rotation speed relative to the web plate (17), wherein the structural element axially directly adjacent to the web plate (17) is a structural element of a shift element, and between the web plate (17) and the said structural element of the shift element axially directly adjacent to the web plate (17) a static-seal element (18) is arranged on a diameter above the bolts (12, 15), in such manner that between the web plate (17) and the structural element of the shift element axially directly adjacent to the web plate (17) a lubricant chamber (109) is formed, such that for a lubricant feed (B, C) to the planetary gearwheels (11, 14) lubricant is passed into the lubricant chamber (109), accumulated therein, and fed from the lubricant chamber (109) to the lubricant bores of the bolts (12, 15).

2. The planetary transmission according to claim 1, wherein the sealing element (18) is an O-ring.

3. The planetary transmission according to claim 1, wherein the sealing element (18) is a lip seal ring.

4. The planetary transmission according to claim 1, wherein the sealing element (18) has one of a rectangular or trapezium-shaped cross-section.

5. The planetary transmission according to claim 1, wherein the sealing element (18) is arranged in one or more of a radial groove of the web plate (17) and in a radial groove of the structural element axially directly adjacent to the web plate (17).

6. The planetary transmission according to claim 1, wherein the sealing element (18) is arranged in one or more of an axial groove of the web plate (17) and in an axial groove of the structural element axially directly adjacent to the web plate (17).

7. The planetary transmission according to claim 1, wherein the sealing element (18) is a gasket seal.

8. The planetary transmission according to claim 1, wherein the web plate (17) is bonded in a lubricant-proof way, above the bolts (12, 15), to the structural element axially directly adjacent to the web plate (17).

9. The planetary transmission according to claim 1, wherein the first planetary gearset (RS1) is made as a plus-gear, with a solar gearwheel (10) which is attached fast to a transmission housing (30) of the planetary transmission, with an annular gearwheel 19 forming an output element of the first planetary gearset (RS1), and with inner and outer planetary gearwheels (11, 14), whose webs (13, 16) as the web plate (17) are connected fast to one another, such that the web plate (17) forms an input element of the first planetary gearset (RS1) and is connected to a drive input shaft (3), an input element of a fifth shift element (80), in particular an outer disk carrier (82) of the fifth shift element (80) is axially adjacent to the first planetary gearset (RS1) and is also connected to the drive input shaft (3), and the sealing element (18) is arranged, on a diameter above the bolts (12, 15) of the inner and outer planetary gearwheels (11, 14), axially between the web plate (17) and the input element of the fifth shift element (80).

10. The planetary transmission according to claim 9, wherein the planetary transmission comprises the first and a second planetary gearset (RS1, RS2) and a total of five shift elements (40, 50, 60, 70, 80), such that by selective closing of the five shift elements (40, 50, 60, 70, 80), six forward gears can be engaged and a transmission input speed n_in of the drive shaft (3) can be transmitted to a drive output shaft (4) of the planetary transmission in such manner that to shift from one gear to a next gear up or down, of the shift elements currently actuated, in each case only one shift element is opened and a different shift element is closed, and such that the second planetary gearset (RS2) has three non-coupled input elements, such that a first input element of the second planetary gearset (RS2) can be connected via the first shift element (40) to the output element of the first planetary gearset (RS1), a second input element of the second planetary gearset (RS2) can be connected via a second shift element (50) to the output element of the first planetary gearset (RS1), and can be fixed relative to the transmission housing (30) by means of a third shift element (60), and the third input element of the second planetary gearset (RS2) can be connected via the fifth shift element (80) to the drive input shaft and can be fixed relative to the transmission housing (30) by means of a fourth shift element (70), and an output element of the second planetary gearset (RS2) is connected to the drive output shaft (4).

11. The planetary transmission according to claim 10, wherein the first planetary gearset (RS1) is arranged close to a transmission housing wall (31) of the transmission housing (30), in a radial direction at least partly above a cylindrical projection (32) of one of the transmission housing wall (31) or a hub (34) attached fast on the transmission housing (31), such that the transmission housing wall (31) is formed as part of the transmission housing (30) or as an intermediate plate (33) connected fast to one of the transmission housing (30), and such that the solar gearwheel (10) of the first planetary gearset (RS1) is in active engagement with one of the projection (32) and the hub (34).

12. The planetary transmission according to claim 11, wherein the transmission housing wall (31) is arranged on a side of the transmission housing (30) facing toward an engine shaft (1) of a drive engine of the planetary transmission which is in active engagement with the drive input shaft (3).

13. The planetary transmission according to claim 10, wherein the first planetary gearset (RS1) and the first, second and fifth shift elements (40, 50, 80) are arranged together, on one side of the second planetary gearset (RS2).

14. The planetary transmission according to claim 10, wherein the fifth shift element (80) is arranged between the first planetary gearset (RS1) and the second planetary gearset (RS2), in an axial direction directly adjacent to the first planetary gearset (RS1).

15. The planetary transmission according to claim 10, wherein the second shift element (50) is arranged closer to the second planetary gearset (RS2) than is the first shift element (40), in particular disks (51) of the second shift element (50) being closer to the second planetary gearset (RS2) than are disks (41) of the first shift element (40).

16. The planetary transmission according to claim 10, wherein the first shift element (40) is arranged directly adjacent to the first planetary gearset (RS1), in particular one or more of disks (41) of the first shift element (40) and a servomechanism (44) of the first shift element (40) being arranged directly adjacent to the first planetary gearset (RS1).

17. The planetary transmission according to claim 10, wherein disks (41) of the first shift element (40) are arranged at least partially radially above the first planetary gearset (RS1).

18. The planetary transmission according to claim 10, wherein disks (51) of the second shift element (50), axially in a direction of the second planetary gearset (RS2), are adjacent to disks (41) of the first shift element (40).

19. The planetary transmission according to claim 10, wherein disks (51) of the second shift element (50) are arranged at least partially radially above the fifth shift element (80), in particular at least partially above disks (81) of the fifth shift element (80).

20. The planetary transmission according to claim 10, wherein a servomechanism (44) of the first shift element (40) is arranged at least partially on a side of the first planetary gearset (RS1) facing away from the second planetary gearset (RS2), in particular radially above one of a cylindrical projection (32) of a transmission housing wall (31) or radially above a hub (34) connected to the transmission housing wall (31), adjacent to the first planetary gearset (RS1).

21. The planetary transmission according to claim 20, wherein the servomechanism (44) of the first shift element (40) actuates disks (41) of the first shift element (40) from a side facing away from the second planetary gearset (RS2).

22. The planetary transmission according to claim 10, wherein an annular gearwheel (19) of the first planetary gearset (RS1) is connected to an outer disk carrier (42) of the first shift element (40) and to an inner disk carrier (53) of the second shift element (50).

23. The planetary transmission according to claim 10, wherein an input element of the first shift element (40), in particular an outer disk carrier (42) of the first shift element (40), is mounted on one of a cylindrical projection (32) of a transmission housing wall (31) or a hub (34) connected to the transmission housing wall (31).

24. The planetary transmission according to claim 23, wherein at least one pressure-feed duct (104) for feeding pressure medium to a servomechanism (44) of the first shift element (40) is arranged within one of a cylindrical projection (32) of the transmission housing wall (31) or in the hub (34) connected to the transmission housing wall (31).

25. The planetary transmission according to claim 10, wherein an output element of the first shift element (40) spans across the fifth shift element (80) radially in an axial direction.

26. The planetary transmission according to claim 10, wherein an output element of the first shift element (40) passes through a clutch space of the second shift element (50).

27. The planetary transmission according to claim 10, wherein a servomechanism (54) of the second shift element (50) is arranged on a side of disks (51) of the second shift element (50) facing toward the second planetary gearset (RS2).

28. The planetary transmission according to claim 27, wherein the servomechanism (54) of the second shift element (50) actuates the disks (51) of the second shift element (50) from a side facing toward the second planetary gearset (RS2).

29. The planetary transmission according to claim 10, wherein a third input element of the second planetary gearset (RS2) is connected via a web shaft (5) to an output element of the fifth shift element (80), the first input element of the second planetary gearset (RS2) is connected via a first solar shaft (6) to an output element of the first shift element (40), and the second input element of the second planetary gearset (RS2) is connected via a second solar shaft (7) to an output element of the second shift element (50), such that the web shaft (5) passes centrally through the second planetary gearset (RS2), the first solar shaft (6) one or more of extends between the first and second planetary gearsets (RS1, RS2) radially above the web shaft (5) and is mounted on the latter, and the second solar shaft (7) one or more of extends between the first and second planetary gearsets (RS1, RS2) radially above the first solar shaft (6) and is mounted on the latter.

30. The planetary transmission according to claim 10, wherein the second planetary gearset (RS2) is formed as a Ravigneaux planetary gearset, with a small solar gearwheel (20) as a first input element, a large solar gearwheel (21) as a second input element, coupled webs (24, 25) as a third input element, and an annular gearwheel (26) as the output element of the second planetary gearset (RS2).

31. The planetary transmission according to claim 10, wherein a hub (34) fixed on the transmission housing or a cylindrical projection (32) of a transmission housing wall (31) has at least one lubricant feed duct (110) for feeding lubricant (C) to the planetary gearwheels (14).

32. The planetary transmission according to claim 31, wherein lubricant flows from the lubricant feed duct (110) of the hub (34) fixed on the transmission housing or the cylindrical projection (32) of the transmission housing wall (31) into a pressure equalization space (49) of the first shift element (40) adjacent to the web plate (17) of the first planetary gearset (RS1), and from the said pressure equalization space (49) into the lubricant chamber (109).

33. The planetary transmission according to claim 32, wherein the baffle plate (47) of the first shift element (40) has at least one lubricant bore (111), through which the lubricant passes from the pressure equalization space (49) into the lubricant chamber (109).

34. The planetary transmission according to claim 33, wherein the lubricant bore (111) of the baffle plate (47) of the first shift element (40) is arranged on a pitch circle diameter of the baffle plate (47), which is larger than pitch circle diameters of lubricant bores of the bolts (15) of the first planetary gearset (RS1) which are effective for the lubricant feed (C) to the planetary gearwheels (14) of the first planetary gearset (RS1).

35. The planetary transmission according to claim 34, wherein the lubricant bore (111) of the baffle plate (47) of the first shift element (40) is arranged on the pitch circle diameter of the baffle plate (47) which is smaller than or equal to the pitch circle diameters of the lubricant bores of the bolts (15) of the first planetary gearset (RS1) which are effective for the lubricant feed (C) to the planetary gearwheels (14) of the first planetary gearset (RS1).

36. The planetary transmission according to claim 1, wherein the first planetary gearset (RS1) is made as a minus-gear, with a solar gearwheel (10) which is attached fast to a transmission housing (30) of the planetary transmission, with an annular gearwheel (19) forming an input element of the first planetary gearset (RS1), and with planetary gearwheels (14) whose web plate (17) forms an output element of the first planetary gearset (RS1), an outer disk carrier (42) is arranged as an input element of a first shift element (40) axially adjacent to the first planetary gearset (RS1) and is connected to the web plate (17), such that a baffle plate (47) of a servomechanism (44) of the first shift element (40) is axially directly adjacent to the web plate (17), and the sealing element (18) is arranged, on a diameter above the bolts (15) of the planetary gearwheels (14), axially between the web plate (17) and the baffle plate (47).

37. The planetary transmission according to claim 36, wherein a drive input shaft (3) has lubricant feed bores (100, 101) for feeding lubricant (B) to the planetary gearwheels (11, 14).

* * * * *